United States Patent
Couch et al.

(10) Patent No.: US 11,427,771 B2
(45) Date of Patent: Aug. 30, 2022

(54) PROCESS AND APPARATS FOR RECOVERING CRACKED HYDROCARBONS

(71) Applicant: UOP LLC, Des Plaines, IL (US)

(72) Inventors: Keith Allen Couch, Arlington Heights, IL (US); Joseph Mark Houdek, Bartlett, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/827,499

(22) Filed: Mar. 23, 2020

(65) Prior Publication Data

US 2020/0308495 A1 Oct. 1, 2020

Related U.S. Application Data

(60) Provisional application No. 62/824,699, filed on Mar. 27, 2019.

(51) Int. Cl.

| | | |
|---|---|---|
| *C10G 55/06* | (2006.01) | |
| *B01J 8/24* | (2006.01) | |
| *B01D 1/22* | (2006.01) | |
| *B01D 3/14* | (2006.01) | |
| *B01J 8/18* | (2006.01) | |

(52) U.S. Cl.
CPC ............ *C10G 55/06* (2013.01); *B01D 1/225* (2013.01); *B01D 3/143* (2013.01); *B01J 8/1827* (2013.01); *B01J 8/24* (2013.01)

(58) Field of Classification Search
CPC ......... C10G 11/18; C10G 55/06; C10G 31/10
See application file for complete search history.

(56) References Cited

U.S. PATENT DOCUMENTS

| | | | | |
|---|---|---|---|---|
| 2,374,518 A | * | 4/1945 | Wolk .................. | C07C 2/62 |
| | | | | 585/720 |
| 2,440,591 A | * | 4/1948 | Lewis ................ | C10G 11/18 |
| | | | | 95/205 |
| 2,879,224 A | * | 3/1959 | Lawson ............. | C10G 11/18 |
| | | | | 208/100 |

(Continued)

FOREIGN PATENT DOCUMENTS

| | | | | |
|---|---|---|---|---|
| WO | WO-2011147173 A1 | * | 12/2011 | ............. C10G 11/18 |
| WO | WO-2016016748 A1 | * | 2/2016 | ............. C10G 49/04 |

OTHER PUBLICATIONS

SMS, Thin Film Evaporators, accessed via <https://www.sms-vt.com/technologies/evaporation-technology/thin-film-evaporator/> on Dec. 2, 2021 (Year: 2021).*

(Continued)

*Primary Examiner* — Michelle Stein
(74) *Attorney, Agent, or Firm* — Paschall & Associates, LLC; James C. Paschall

(57) ABSTRACT

A slurry separator comprising a moving blade that wipes slurry oil onto a wall of the slurry separator for separating a recovered oil stream from a concentrated residue stream has the capability of maximizing recovery of the LCO from slurry oil as well as removing both the catalyst fines as well as coke particles suspended in the slurry oil. The slurry separator can be fed directly from the main column bottoms. Advantageously, the process and apparatus can enable the FCC unit to achieve higher production of LCO and higher value clarified slurry oil more efficiently.

12 Claims, 2 Drawing Sheets

(56) References Cited

U.S. PATENT DOCUMENTS

| | | | | |
|---|---|---|---|---|
| 3,428,530 A * | 2/1969 | Fauche | C07F 7/20 | 203/72 |
| 3,554,266 A * | 1/1971 | Baird | B01D 1/225 | 159/49 |
| 4,052,291 A * | 10/1977 | Espenscheid | C10C 3/005 | 208/434 |
| 4,093,479 A * | 6/1978 | Baird | B01D 1/226 | 159/13.2 |
| 4,213,856 A * | 7/1980 | Blake | B07B 1/00 | 165/119 |
| 4,310,489 A * | 1/1982 | Fahrig | C10G 11/18 | 208/153 |
| 4,361,462 A * | 11/1982 | Fujii | B01D 1/226 | 159/6.2 |
| 4,750,964 A * | 6/1988 | Hettinger, Jr. | D01F 9/322 | 156/361 |
| 4,816,195 A * | 3/1989 | Hettinger, Jr. | D01F 9/14 | 242/118.1 |
| 4,919,792 A * | 4/1990 | Huh | C10G 55/02 | 208/182 |
| 4,927,620 A * | 5/1990 | Ward | C10C 3/002 | 208/22 |
| 5,074,057 A * | 12/1991 | Kanai | B01F 15/065 | 34/179 |
| 5,238,672 A * | 8/1993 | Sumner | D01F 9/155 | 208/39 |
| 5,290,431 A * | 3/1994 | Cunningham | B01J 38/06 | 208/113 |
| 8,540,870 B2 | 9/2013 | McGehee | | |
| 2001/0032803 A1* | 10/2001 | Mon | C10G 51/00 | 208/74 |
| 2004/0149395 A1* | 8/2004 | Strand | B09B 3/0091 | 159/47.1 |
| 2010/0326887 A1* | 12/2010 | McGehee | C10G 47/00 | 208/107 |
| 2013/0175203 A1* | 7/2013 | Hypes | C10G 11/182 | 208/177 |
| 2015/0338162 A1* | 11/2015 | Hoffman | F26B 17/20 | 34/429 |

OTHER PUBLICATIONS

Tech Square, "Rototherm", , Publisher: Global Engineering Solutions.

Artisan Industries, "The Artisan Rototherm", Nov. 15, 2019, Published in: United States.

* cited by examiner

PROCESS AND APPARATS FOR RECOVERING CRACKED HYDROCARBONS

CROSS-REFERENCE TO RELATED APPLICATIONS

This application claims priority from provisional application 62/824,699, filed Mar. 27, 2019, incorporated herein in its entirety.

BACKGROUND

The field is fluid catalytic cracking (FCC).

FCC technology, now more than 50 years old, has undergone continuous improvement and remains the predominant source of gasoline production in many refineries. This gasoline, as well as lighter products, is formed from cracking heavier, less valuable hydrocarbon feed stocks such as gas oil and residues.

In its most general form, the FCC process and apparatus comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst which is burned off in the regenerator.

Although the FCC process upgrades a heavy oil into lighter, more valuable products, it also creates a heavier, hydrogen deficient product known as slurry oil or main column bottoms. Slurry oil is obtained from the bottom of the main fractionation column and has a nominal boiling point starting at least at about 250° C. (482° F.). The slurry oil is typically blended into fuel oil, bunker fuel, or another similarly low value product pool. The slurry oil typically contains a fraction of Light Cycle Oil (LCO) that is, if recovered, ideally used in distillate (diesel) blending. The fraction of LCO present in the slurry oil is adjusted to control the bottom temperature in the main fractionation column for process reliability reasons, and typically ranges from 1 to 15 wt-% of the total slurry oil. Too hot of a temperature in the main column bottoms promotes coking and fouling in the slurry oil recycle circuit. However, leaving LCO in the slurry oil reduces the total value of products recovered from the FCC process. In ideal operation, the refiner would like to maximize LCO recovery from the slurry oil to maximize product value upgrade.

In addition to LCO, the slurry oil also contains small catalyst particles, or catalyst fines, carried over in the hydrocarbon vapors from the FCC reactor. These fines are typically sized in the range of about 0 to about 40 microns and concentrated in the range of about 1500 to about 5000 wppm. Refiners often want to remove these fines to increase the value of the product, typically referred to as clarified oil when fines are removed. The LCO-deficient clarified oil can then be used as carbon black feedstock, or higher quality fuel oil.

Since the inception of FCC technology refiners have removed these catalyst fines through large volume settling tanks that have to be manually cleaned out on a periodic basis, mechanical filtration via sintered metal or pressed wire mesh filters, hydrocyclones, or electrostatic filtration systems. Each of these technologies has demonstrated less than ideal performance and have been problematic in the industry.

A process and apparatus of improved efficiency in removing catalyst fines from slurry oil is sought that would increase the recovery of cycle oil and of clarified slurry oil.

SUMMARY

We have discovered a process and apparatus for efficiently removing catalyst fines from FCC slurry oil. A slurry separator comprising a moving blade that wipes slurry oil onto a wall of the slurry separator for separating a recovered oil stream from a concentrated residue stream has the capability of maximizing recovery of essentially solids-free oil from slurry oil as well as removing both the catalyst fines as well as coke particles suspended in the slurry oil. The slurry separator can be fed directly from the main column bottoms circulation pumps or further downstream in the main column bottoms circuit. Advantageously, the process and apparatus can enable the FCC unit to achieve higher production of higher value, solids-free oil more efficiently.

Additional features and advantages of the invention will be apparent from the description of the invention, figure and claims provided herein.

DEFINITIONS

Figure 2:
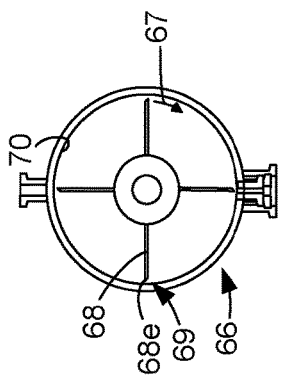
FIG. 2 is a sectional view taken along the segment 2-2 in FIG. 1.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam or nitrogen As used herein, the term "True Boiling Point" (TBP) or "TBP method" means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel cut point" is between about 343° C. (650° F.) and about 399° C. (750° F.) using the TBP method.

As used herein, the term "diesel boiling range" means hydrocarbons boiling in the range of between about 132° C. (270° F.) and the diesel cut point using the TBP method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

DETAILED DESCRIPTION

Figure 1:
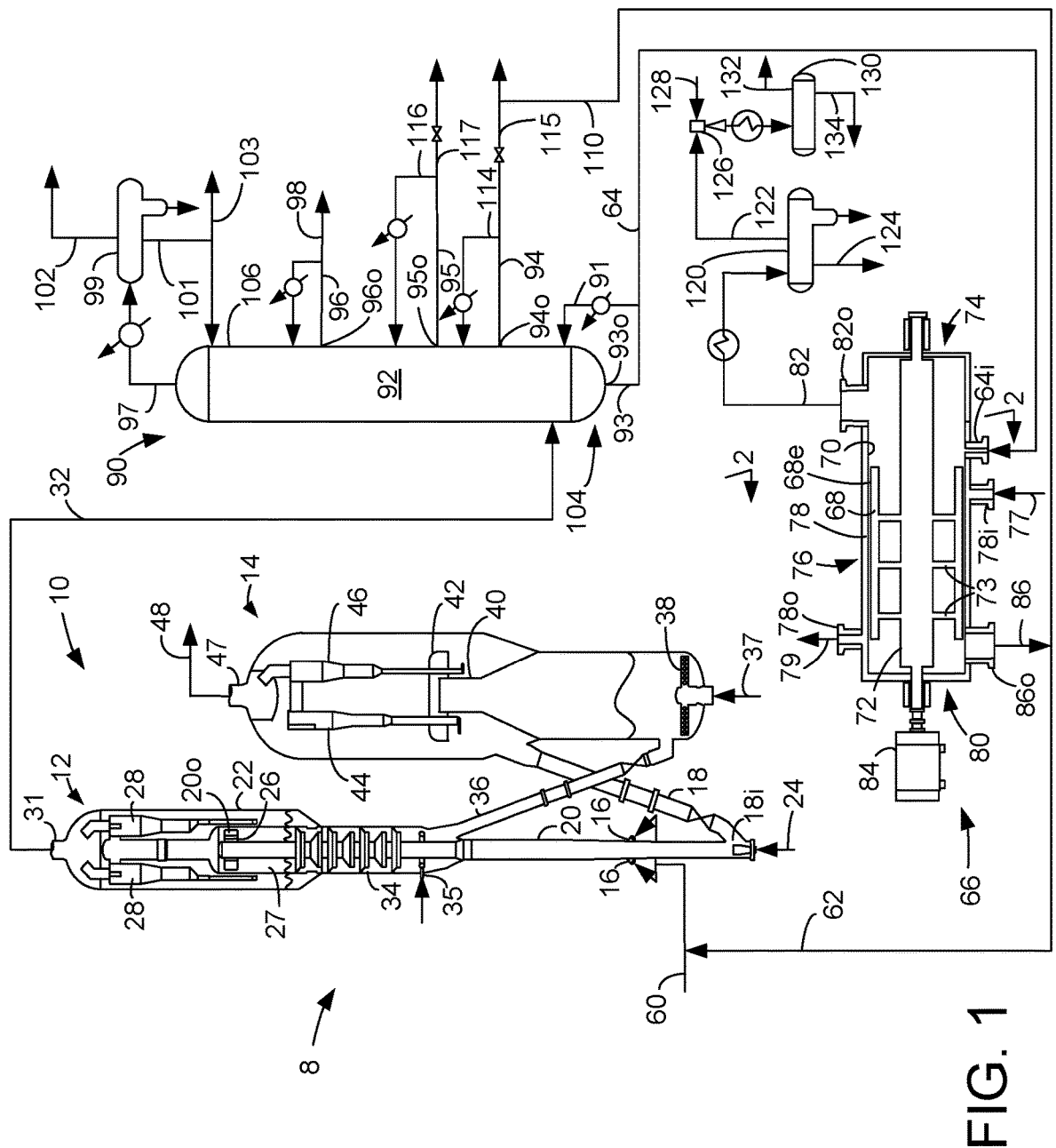
FIG. 1 is a schematic drawing of an FCC unit with a slurry separator.

FIG. 1, wherein like numerals designate like components, illustrates an apparatus and process 8 that is equipped for processing a fresh hydrocarbon feed stream. The apparatus and process 8 generally include an FCC unit 10 and an FCC recovery section 90 that includes a slurry recovery section 66.

The FCC unit 10 includes an FCC reactor 12 comprising a riser 20 and a catalyst regenerator 14. A hydrocarbon feed stream comprising an FCC feedstock in a feed line 60 is fed to the FCC reactor 12 through feed distributors 16.

A conventional FCC feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of at least about 232° C. (450° F.), a T5 of about 288° C. (550° F.) to about 343° C. (650° F.), a T95 between about 510° C. (950° F.) and about 570° C. (1058° F.) and/or an EP of no more than about 626° C. (1158° F.) prepared by vacuum fractionation of atmospheric residue. Such a fraction is generally low in coke precursors and heavy metal contamination which can serve to contaminate catalyst. Atmospheric residue is another suitable feedstock boiling with an IBP of at least about 315° C. (600° F.), a T5 between about 340° C. (644° F.) and about 360° C. (680° F.) and/or a T95 of between about 700° C. (1292° F.) and about 900° C. (1652° F.) obtained from the bottoms of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, and vacuum reduced crudes. Fresh hydrocarbon feedstocks also include mixtures of the above hydrocarbon streams and the foregoing list is not exhaustive.

The FIG. 1 shows a typical FCC unit 10. In the FCC unit 10, the FCC feed stream in the feed line 60 is fed to the FCC reactor 12 to be contacted with a regenerated cracking catalyst. Specifically, in an embodiment, regenerated cracking catalyst entering from a regenerator conduit 18 is contacted with the FCC feed stream in a riser 20 of the FCC reactor 12. The regenerator conduit 18 is in downstream communication with the regenerator 14. The riser 20 has an inlet 18*i* in downstream communication with said regenerator conduit 18. The regenerator conduit 18 is connected to the FCC riser 20 at a lower end.

A recycle stream in recycle line 62 carrying residual oil perhaps in a carrier fluid may be mixed with the hydrocarbon feed stream in the hydrocarbon feed line 60 to become part of the hydrocarbon feed stream fed to the FCC reactor 12. Specifically, in an embodiment, the regenerated cracking catalyst is contacted with the recycle stream along with the hydrocarbon feed stream in a riser 20 of the FCC reactor 12. In the riser 20 of the FCC reactor 12, the FCC feed stream and perhaps the recycle stream are contacted with catalyst to catalytically crack the FCC feed stream to provide a cracked stream.

The contacting of the hydrocarbon feed stream with cracking catalyst may occur in the riser 20 of the FCC reactor 12, extending upwardly to the bottom of a reactor vessel 22. The contacting of feed and catalyst is fluidized by gas from a fluidizing line 24. Heat from the catalyst vaporizes the hydrocarbon feed stream which is thereafter cracked to lighter molecular weight hydrocarbons in the presence of the cracking catalyst as it is transferred up the riser 20 into the reactor vessel 22. In the FCC reactor 12, the FCC feed stream cracks to conventional cracked products such as gasoline and diesel. The cracked stream of hydrocarbon products and spent catalyst in the riser 20 are thereafter discharged from the riser outlet 20*o* into a disengaging chamber 27 which contains the riser outlet. The cracked stream of hydrocarbon products is disengaged from the cracking catalyst in the disengaging chamber 27 using a rough-cut separator 26. Cyclonic separators which may include one or two stages of cyclones 28 in the reactor vessel 22 further separate catalyst from hydrocarbon products. A cracked stream of product gases exits the reactor vessel 22 through a product outlet 31 to a cracked line 32 for transport to a downstream FCC recovery section 90. In an embodiment, the regenerator conduit 18 is in downstream communication with the disengaging chamber 27. The outlet temperature of the cracked products leaving the riser 20 may be between about 472° C. (850° F.) and about 538° C. (1000° F.).

Inevitable side reactions occur in the riser 20 leaving coke deposits on the catalyst that lower catalyst activity. The spent or coked catalyst requires regeneration for further use. Coked catalyst, after separation from the gaseous cracked product hydrocarbons, falls into a stripping section 34 where steam is injected through a nozzle 35 and distributor to purge any residual hydrocarbon vapor. After the stripping operation, the spent catalyst is fed to the catalyst regenerator 14 through a spent catalyst conduit 36. The catalyst regenerator 14 may be in downstream communication with the riser 20, specifically, the riser outlet 20o.

FIG. 1 depicts a regenerator 14 known as a combustor. However, other types of regenerators are suitable. In the catalyst regenerator 14, a stream of oxygen-containing gas, such as air, is introduced from line 37 through an air distributor 38 to contact the coked catalyst, burn coke deposited thereon, and provide regenerated catalyst and flue gas. Catalyst and air flow upwardly together along a combustor riser 40 located within the catalyst regenerator 14 and, after regeneration, are initially separated by discharge through a disengager 42. Finer separation of the regenerated catalyst and flue gas exiting the disengager 42 is achieved using first and second stage separator cyclones 44, 46, respectively, within the catalyst regenerator 14. Catalyst separated from flue gas dispenses through diplegs from cyclones 44, 46 while flue gas significantly lighter in catalyst sequentially exits cyclones 44, 46 and exit the regenerator vessel 14 through a flue gas outlet 47 in a flue line 48. Regenerated catalyst is recycled back to the reactor riser 20 through the regenerated catalyst conduit 18.

As a result of the coke burning, the flue gas vapors exiting at the top of the catalyst regenerator 14 in the flue line 48 contain CO, $CO_2$ and $H_2O$, along with smaller amounts of other species. Catalyst regeneration temperature is between about 500° C. (932° F.) and about 900° C. (1652° F.). Both the cracking and regeneration occur at an absolute pressure below about 5 atmospheres.

In the FCC recovery section 90, the cracked stream in the cracked line 32 is separated into product streams. The gaseous cracked stream in the cracked line 32 is fed to a lower section of an FCC main fractionation column 92. The main fractionation column 92 is in downstream communication with the riser 20 and the FCC reactor 12. Several fractions may be separated and taken from the main fractionation column 92 including a heavy slurry oil stream from a main column bottoms outlet 93o in a bottoms line 93, a HCO stream in a heavy line 94, a LCO stream in a light line 95 and an optional heavy naphtha stream in a naphtha line 98. Gasoline and gaseous light hydrocarbons are removed in an overhead line 97 from the main fractionation column 92 and condensed before entering a main column receiver 99. An aqueous stream is removed from a boot in the receiver 99. Moreover, a condensed unstabilized, light naphtha stream is removed in a liquid overhead line 101 while a light hydrocarbon stream is removed in vapor overhead line 102. A portion of the light naphtha stream in the liquid overhead line 101 may be refluxed to the main fractionation column 92 while a light naphtha concentration stream is taken in a concentration line 103. Both streams in lines 102 and 103 may enter a vapor recovery section downstream of the main fractionation column 92.

The light unstabilized naphtha fraction preferably has an initial boiling point (IBP) in the $C_5$ range; i.e., between about 0° C. (32° F.) and about 35° C. (95° F.), and an end point (EP) at a temperature greater than or equal to about 127° C. (260° F.). The optional heavy naphtha fraction has an IBP just above about 127° C. (260° F.) and an EP at a temperature above about 204° C. (400° F.), preferably between about 200° C. (392° F.) and about 221° C. (430° F.). The LCO stream has an IBP just above about 127° C. (260° F.) if no heavy naphtha cut is taken or just above about the EP temperature of the heavy naphtha if a heavy naphtha cut is taken and an EP in a range of about 360° C. (680° F.) to about 382° C. (720° F.). The LCO stream may have a T5 in the range of about 213° C. (416° F.) to about 244° C. (471° F.) and a T95 in the range of about 354° C. (669° F.) to about 377° C. (710° F.). The HCO stream has an IBP just above the EP temperature of the LCO stream and an EP in a range of about 385° C. (725° F.) to about 427° C. (800° F.). The HCO stream may have a T5 in the range of about 332° C. (630° F.) to about 349° C. (660° F.) and a T95 in the range of about 382° C. (720° F.) to about 404° C. (760° F.). The heavy slurry oil stream has an IBP just above the EP temperature of the HCO stream and includes everything boiling at a higher temperature.

The main fractionation column 92 has the main column bottoms outlet 93o in a bottom 104 of the main fractionation column 92 from which a slurry stream is taken. The main column bottoms outlet 93o is taken from the bottom 104 of the main fractionation column 92 meaning below a lowest tray in the column. The feed distributors 16 in the FCC reactor 12 may be in downstream communication with the main column bottoms outlet 93o. A portion of the slurry oil stream in the bottoms line 93 may be cooled and recycled in line 91 back to the main fractionation column 92. A process slurry stream is taken in a process line 64.

A lowest auxiliary outlet 94o and a penultimate lowest outlet 95o may be in the side 106 of the main fractionation column 92. The cycle line 110 may transport a cycle cracked stream comprising at least a portion of the HCO side stream from the lowest auxiliary outlet 94o to the FCC reactor 12. If it is desired to recycle HCO to the FCC unit 10, an HCO stream is taken as a cycle cracked stream in the cycle line 110 from the lowest auxiliary outlet 94o in the side 106 of the main fractionation column 92 regulated by a control valve on line 115. When the control valve on line 115 is opened, the FCC unit 10 is in downstream communication with the lowest auxiliary outlet 94o.

A diesel stream may be recovered in an LCO product line 117 at a flow rate regulated by a control valve thereon. An LCO stream is taken in line 95 from the penultimate lowest auxiliary outlet 95o in the side 106 of the main fractionation column 92. An LCO product stream is taken in line 117 from line 95 regulated by a control valve on line 117. A recycle LCO stream is taken in line 116 from line 95, cooled and returned to the main column 92. Any or all of the product streams in lines 94-96 may be cooled and pumped back to the main column 92 typically at a higher location. Specifically, a side stream may be taken from the side outlet 94o, 95o or 96o in the side 106 of the main fractionation column 92. The side stream may be cooled and returned to the main fractionation column 92 to cool the main fractionation column 92. A heat exchanger may be in downstream communication with the side outlet 94o, 95o or 96o.

A heavy naphtha stream in line 96 may be returned to the main fractionation column 92 after cooling while a heavy naphtha product stream may be taken in line 98. Gasoline may be recovered from the light naphtha concentration stream in the concentration line 103.

The process slurry stream in process line 64 may comprise light cycle oil that can supplement the diesel pool, heavy cycle oil which can supplement fuel oil reserves, FCC catalyst fines and remaining bottoms oil from which catalyst fines can be removed to produce carbon black. The process slurry stream may have between about 500 wppm and about 6000 wppm, preferably between about 1000 and about 5000 wppm of catalyst fines having an average largest diameter of about 0 to about 40, preferably to about 20 microns. These products are more valuable if separated from each other and if the catalyst fines are removed from it. We propose to separate the slurry oil stream in a slurry separator 66 to upgrade these product streams.

The slurry separator 66 is in fluid downstream communication with the bottom 104 of the main fractionation column 92, specifically the main column bottoms outlet 93*o*. The slurry separator 66 may be any separator that generates a thin film of slurry oil on an inner wall 70 of the slurry separator to facilitate evaporation of a recovered oil stream from a concentrated residue stream. A preferred slurry separator 66 utilizes a blade 68 to wipe the slurry oil stream onto the inner wall 70 of the slurry separator. The blade 68 preferably rotates on a shaft 72 within the inner wall 70 that may be cylindrical. The slurry oil stream is fed in the process line 64 to the slurry separator 66 through a slurry oil inlet 64*i* on a first end 74 of the slurry separator. The slurry oil temperature should be elevated, so that it is exposed to minimal cooling after exiting the main fractionation column 92 in the main column bottoms line 93. The slurry separator 66 comprises a middle section 76 having a double wall that defines an annular chamber 78 or jacket. The inner wall 70 may comprise the inner wall of the annular chamber 78 and consist of stainless steel. A heating media stream in media line 77 such as hot oil may be fed to a media inlet 78*i* to the annular chamber 78 in the first end 74 of the slurry separator 66. The heating media heats the inner wall 70 of the annular chamber 78 and is withdrawn from the annular chamber through a media outlet 78*o* in a second end 80 of the annular chamber in media outlet line 79. The heating media may range in temperature from between about 246° C. (475° F.) to about 426° C. (800° F.), preferably no more than 399° C. (750 F°). The internal oil temperature of the slurry oil film in the slurry separator 66 is no more than about 349° C. (660° F.) to about 371° C. (700° F.).

The slurry oil stream in process line 64 enters the first end 74 of the slurry separator 66 through the slurry oil inlet 64*i* and encounters the rotating blade 68. The rotating blade 68 generates a centrifugal force which throws the slurry oil stream against the inner wall 70 and maintains the slurry oil stream in contact with the heated inner wall 70 of the slurry separator 66 thus facilitating separation by vaporizing oil from the slurry oil to leave a liquid residual oil. The blade may be rotated at a tip speed of about 10 m (30 ft.) per second to about 20 m (60 ft.) per second. A vaporized oil or recovered oil stream exits the slurry separator 66 through a recovered oil outlet 82*o* in recovered oil line 82. To facilitate vaporization and separation of the recovered oil from the slurry oil stream, a vacuum may be pulled on the recovered oil stream to give an absolute pressure in the slurry oil separator 66 of about 133 Pa (1 Torr) to about 6.67 kPa (50 Torr). The rotating shaft 72 may be driven by a motor 84 that rotates the blade 68 in the slurry separator 66. The shaft 72 may extend from the first end 74 to the second end 80 of the slurry separator 66.

FIG. 2 is a sectional view taken along the segment 2-2 in FIG. 1. FIG. 2 depicts the blade 68 has an outer edge 68*e* that is spaced from the inner wall 70 of the slurry separator 66 for generating a film by wiping the slurry oil stream onto the inner wall 70 during rotation. The outer edge 68*e* of the blade may be tapered so as to present a sharper edge to the slurry oil material. The taper is configured to present the longer portion of the edge in a direction of rotation 67 to the slurry oil material before the shorter portion of the edge. A plurality of blades 68 may be used in the slurry separator 66. In an embodiment, four blades 68 may be used phased at ninety degrees from each other.

Turning back to FIG. 1, the blade 68 may be held onto the shaft 72 by spokes 73 that radially extend from the shaft. The rotating blade 68 occupies the middle section 76 of the slurry separator 66. The slurry oil steam fed to the first end 74 of the slurry separator 66 is wiped by the blade 68 against the inner wall 70 in the middle section 76 to effect separation and produce a concentrated residue stream that is withdrawn from the second end 80 of the slurry separator through a residue outlet 86*o* in a residue line 86. The blade 68 may extend toward the second end 80 such that it overlaps with an imaginary upward projection of the residue outlet 86*o*.

The slurry separator 66 preferably may have a horizontal orientation; that is, it has a greater width than its height. The shaft 72 is horizontally oriented, supported by bearings at the first end 74 and the second end 80. The rotating blade 68 or blades rotate about a horizontal axis within an inner wall 70 that defines a cylinder on its side. Slurry oil generally travels laterally from the first end 74, through the middle section 76 to the second end 80.

The rotating blade 68 holds a thin film of slurry feed against the heated inner wall 70. The turbulent thin film between the blade 68 and the inner wall 70 may cover the entire heated inner wall 70 at all times, regardless of feed rate or evaporation rate. The slurry oil film is constantly renewed by the incoming slurry stream in the slurry oil line 64 as the progressively more concentrated residue material is displaced towards the residue outlet 86*o*. A high vacuum may be maintained to minimize processing temperature. Degradation of heat sensitive materials is minimized because the residence time in the slurry separator 66 is sufficiently short, generally measured in seconds. The slurry oil stream may reside in the slurry separator 66 for about 1 to about 10 seconds.

In an embodiment the recovered oil outlet 82*o* is in the first end 74 of the slurry separator 66, such that the vaporized oil moves counter-currently to the slurry oil stream moving from the first end 74 through the middle section 76 to the residue outlet 86*o* in the second end 80. It is also contemplated that the recovered oil outlet 82*o* be located in the second end 80, such that the vaporized oil moves co-currently to the slurry oil stream.

In an embodiment, the residue stream in the residue line 86 may be mixed with a cycle oil stream fractionated from the cracked stream in the cracked line 32 to produce a recycle stream in a recycle line 62 to be mixed with the fresh hydrocarbon feed stream in the hydrocarbon feed line 60 for return to the FCC reactor 12. The cycle oil stream may comprise heavy cycle oil in cycle line 110 which serves as a carrier to carry the residue stream to the FCC unit 10. The fresh hydrocarbon feed stream from the hydrocarbon feed line 60 may alternatively serve as a carrier to carry the residue stream to the FCC unit 10.

Figure 3:
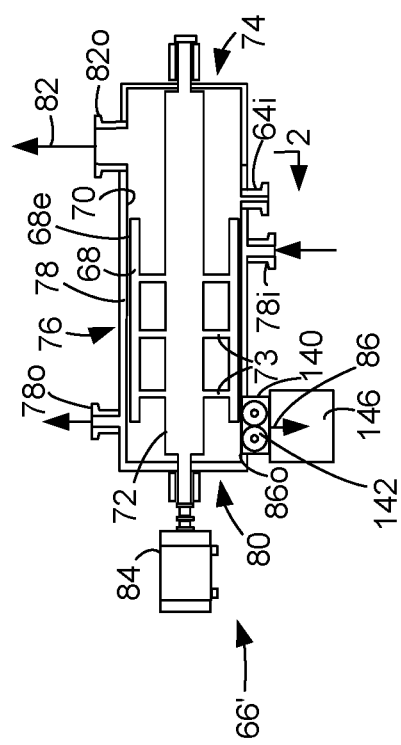
FIG. 3 is a schematic drawing of an alternate embodiment of the slurry separator of FIG. 1.

Coke and catalyst in the residue stream 86 can be sticky, viscous, tarry, and/or crust-forming as they are concentrated or dried in the slurry separator 66. In an embodiment of FIG. 3, the residue outlet 86*o* may be equipped with an augur 142 that removes solids comprising catalyst fines and coke particles from the residue stream. In FIG. 3, depicting an alternative embodiment of the slurry separator 66', an augur barrel 140 is depicted at the residue outlet 86*o* of FIG. 1. The augur barrel 140 is equipped with an augur 142 and perhaps two augurs. The augur 142 can eliminate product build-up from the residue outlet 86*o*. The augur barrel 140 may be fastened or welded to the residue outlet 86*o*. The augur(s) 142 may be located in the slurry separator 66' effectively tangential to the cylindrical rotation of the blade(s) 68.

Figure 4:
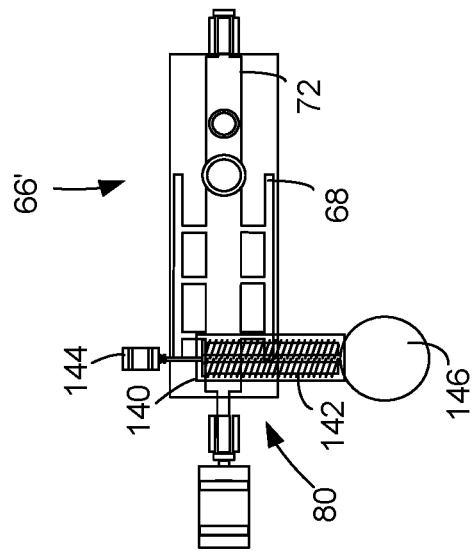
FIG. 4 is a schematic drawing of an underside of the slurry separator of FIG. 3.

As shown in FIG. 4, which is taken from an underside of the slurry separator 66' in FIG. 3, the augur barrel 140 is oriented perpendicular to the shaft 72 and/or a longitudinal axis of the slurry separator 66'. A single augur 142 or a self-cleaning, intermeshing twin screw augur may be installed in the augur barrel 140. The augur(s) 142 may be driven by a variable speed drive motor 144.

Turning back to FIG. 3, as the concentrated residue stream enters the second end 80 of the slurry separator 66, the blade(s) 68 pushes the residue stream directly into the augur 142. The augur 142 pushes the reside stream final product into a collection vessel 146 and/or extrudes it through a die plate. The residue stream itself can make a vacuum-to-atmosphere seal at the outlet of the augur barrel 140.

Turning back to FIG. 1, a cooler may be in downstream communication with the recovered oil outlet 82o on the recovered oil line 82 for cooling and condensing the recovered oil stream. The condensed recovered oil stream may enter a receiver 120 in downstream communication with the slurry separator 66. The condensed recovered oil stream is separated in the receiver 120 into a recovered oil product stream taken from a bottom of the receiver 120 in a recovered bottoms line 124 and a vaporous recovered overhead stream taken in a recover overhead line 122. The liquid recovered oil product stream in the recovered bottoms line 124 is HCO rich and LCO rich. The recovered oil product stream in the recovered bottoms line 124 may be fed to the diesel pool, perhaps after a separation of LCO from HCO. HCO may be utilized as fuel oil. The receiver 120 may be operated under vacuum pressure of about 2 kPa (absolute) (15 Torr) and about 10 kPa (absolute) (75 Torr) and a temperature between about 37° C. (100° F.) to about 149° C. (300° F.), preferably no more than about 121° C. (250° F.).

A vacuum generation device 126 such as an eductor or a vacuum pump may be in downstream communication with the recover overhead line 122 for pulling a vacuum on the recover overhead stream which in turn generates a vacuum on the recovered oil line 82 and, hence, the slurry separator 66. In an embodiment, when the vacuum generation device 126 is an eductor, the eductor may be in downstream communication with an inert gas stream 128 such as steam which pulls a vacuum on the recover overhead stream in the recover overhead line 122. The eductor feeds the inert gas stream mixed with the recover overhead stream to a condenser. The condensed mixture of the inert gas stream and the recover overhead stream exit the condenser and enter into a drain drum 130. A vaporous hydrocarbon stream in line 132 from the drain drum 130 may be vented to flare or recovery. A condensed stream of sour water may also be removed from the drain drum in drum bottoms line 134 and taken to water treatment facilities.

It is contemplated that several slurry separators 66 be used in different configurations to provide necessary capacity and achieve desired quality for sufficient slurry oil separation.

Specific Embodiments

While the following is described in conjunction with specific embodiments, it will be understood that this description is intended to illustrate and not limit the scope of the preceding description and the appended claims.

A first embodiment of the invention is a process for catalytically cracking hydrocarbons comprising feeding a hydrocarbon feed stream to a FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; feeding the slurry oil stream to a slurry separator; generating a thin film of slurry oil on a wall of the slurry separator; separating the slurry oil stream into a recovered oil stream and a concentrated residue stream in the slurry separator. An embodiment of the invention is one, any or all of prior embodiments in this paragraph up through the first embodiment in this paragraph comprising generating the thin film of slurry oil by rotating a blade to wipe the slurry oil onto a wall of the slurry separator. An embodiment of the invention is one, any or all of prior embodiments in this paragraph up through the first embodiment in this paragraph further comprising generating centrifugal force by the rotating blade which maintains the slurry oil in contact with the heated inner wall of the slurry separator. An embodiment of the invention is one, any or all of prior embodiments in this paragraph up through the first embodiment in this paragraph further comprising heating an inner wall of the separator to facilitate separation. An embodiment of the invention is one, any or all of prior embodiments in this paragraph up through the first embodiment in this paragraph further comprising pulling a vacuum on the separator to facilitate separation. An embodiment of the invention is one, any or all of prior embodiments in this paragraph up through the first embodiment in this paragraph further comprising withdrawing solids from the residue stream by a rotating augur. An embodiment of the invention is one, any or all of prior embodiments in this paragraph up through the first embodiment in this paragraph wherein the blade has an outer edge that is spaced from the inner wall of the separator for generating a film by wiping the slurry oil stream onto the inner wall during rotation. An embodiment of the invention is one, any or all of prior embodiments in this paragraph up through the first embodiment in this paragraph wherein the rotating blade occupies a middle section of the slurry separator and further comprising feeding the slurry oil to a first end of the slurry separator and withdrawing the concentrated residue stream from a second end of the slurry separator. An embodiment of the invention is one, any or all of prior embodiments in this paragraph up through the first embodiment in this paragraph wherein the slurry separator comprises a double wall in the middle section of the slurry separator that comprises an annular chamber and further comprising feeding heating medium to the annular chamber at a first end of the slurry separator and withdrawing the heating medium from the second end of the slurry separator. An embodiment of the invention is one, any or all of prior embodiments in this paragraph up through the first embodiment in this paragraph further comprising withdrawing a vaporized recovered oil from a first end of the slurry separator. An embodiment of the invention is one, any or all of prior embodiments in this paragraph up through the first embodiment in this paragraph further comprising fractionating the cracked stream to produce a cycle oil stream in the main fractionation column and mixing the concentrated residue stream from the slurry separator with the cycle oil stream.

A second embodiment of the invention is an apparatus for catalytically cracking hydrocarbons comprising an FCC reactor for contacting a hydrocarbon feed stream with catalyst to catalytically crack the hydrocarbon feed stream to provide a cracked stream; a main fractionation column in fluid communication with the FCC reactor for fractionating the cracked stream into products including a slurry oil stream from a bottom of the main fractionation column; a slurry separator in fluid communication with the bottom of the main fractionation column comprising a blade that wipes the slurry oil onto a wall of the slurry separator for separating a recovered oil stream from a concentrated residue stream in the slurry separator; a slurry oil inlet in a first end of the slurry separator; and a residual oil outlet on a second of the slurry separator. An embodiment of the invention is one, any or all of prior embodiments in this paragraph up through the second embodiment in this paragraph further comprising a double walled annular chamber in a middle section of the slurry separator between the first end and the second end for heating an inner surface of the slurry separator, the annular chamber having a heating medium inlet and a heating medium outlet. An embodiment of the invention is one, any or all of prior embodiments in this paragraph up through the second embodiment in this paragraph wherein the blade rotates on a shaft in a middle section of the slurry separator. An embodiment of the invention is one, any or all of prior embodiments in this paragraph up through the second embodiment in this paragraph further comprising a recovered oil outlet in the first end of the slurry separator and withdrawing a vaporized recovered oil from the recovered oil outlet. An embodiment of the invention is one, any or all of prior embodiments in this paragraph up through the second embodiment in this paragraph further comprising vacuum pulling device in fluid communication with the recovered oil outlet. An embodiment of the invention is one, any or all of prior embodiments in this paragraph up through the second embodiment in this paragraph further comprising an augur in the residue outlet for removing solids from the residue stream. An embodiment of the invention is one, any or all of prior embodiments in this paragraph up through the second embodiment in this paragraph wherein the blade has an outer edge that is spaced from the inner surface of the slurry separator for generating a film by wiping the slurry oil stream onto the inner surface during rotation.

A third embodiment of the invention is a process for catalytically cracking hydrocarbons comprising feeding a hydrocarbon feed stream to a FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; feeding the slurry oil stream to a slurry separator; rotating a blade to wipe the slurry oil onto a wall of the slurry separator to generate a thin film of slurry oil on a wall of the slurry separator; separating the slurry oil stream into a recovered oil stream and a concentrated residue stream in the slurry separator. An embodiment of the invention is one, any or all of prior embodiments in this paragraph up through the third embodiment in this paragraph further comprising heating an inner surface of the separator and pulling a vacuum on the separator to facilitate separation.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A process for catalytically cracking hydrocarbons comprising:
feeding a hydrocarbon feed stream to a FCC reactor and contacting said hydrocarbon feed stream with catalyst to catalytically crack said hydrocarbon feed stream to provide a cracked stream;
disengaging said catalyst from said cracked stream;
fractionating said cracked stream into products including a slurry oil stream from a bottom of a main fractionation column;
feeding said slurry oil stream to a slurry separator, wherein the slurry separator is fed directly from the bottom of the main fractionation column;
generating a thin film of slurry oil on a wall of the slurry separator by rotating a blade held onto a shaft by spokes to wipe said slurry oil onto a wall of the slurry separator;
separating said slurry oil stream into a recovered oil stream and a concentrated residue stream in said slurry separator.

2. The process of claim 1 further comprising generating centrifugal force by said rotating blade which maintains said slurry oil in contact with said heated inner wall of said slurry separator.

3. The process of claim 1 further comprising heating an inner wall of said separator to facilitate separation.

4. The process of claim 1 further comprising pulling a vacuum on said separator to facilitate separation.

5. The process of claim 1 further comprising withdrawing solids from said residue stream by a rotating augur.

6. The process of claim 3 wherein said blade has an outer edge that is spaced from said inner wall of said separator for generating a film by wiping said slurry oil stream onto said inner wall during rotation.

7. The process of claim 1 wherein said rotating blade occupies a middle section of said slurry separator and further comprising feeding said slurry oil to a first end of said slurry separator and withdrawing said concentrated residue stream from a second end of said slurry separator.

8. The process of claim 6 wherein said slurry separator comprises a double wall in the middle section of said slurry separator that comprises an annular chamber and further comprising feeding heating medium to said annular chamber at a first end of said slurry separator and withdrawing said heating medium from said second end of said slurry separator.

9. The process of claim 7 further comprising withdrawing a vaporized recovered oil from a first end of said slurry separator.

10. The process of claim 1 further comprising fractionating said cracked stream to produce a cycle oil stream in said main fractionation column and mixing said concentrated residue stream from said slurry separator with said cycle oil stream.

11. A process for catalytically cracking hydrocarbons comprising:
feeding a hydrocarbon feed stream to a FCC reactor and contacting said hydrocarbon feed stream with catalyst to catalytically crack said hydrocarbon feed stream to provide a cracked stream;
disengaging said catalyst from said cracked stream;
fractionating said cracked stream into products including a slurry oil stream from a bottom of a main fractionation column;
feeding said slurry oil stream to a slurry separator, wherein the slurry separator is fed directly from the bottom of the main fractionation column;

rotating a blade to wipe said slurry oil onto a wall of the slurry separator to generate a thin film of slurry oil on a wall of the slurry separator;
separating said slurry oil stream into a recovered oil stream and a concentrated residue stream in said slurry separator; and
withdrawing solids from a bottom of the slurry separator.

12. The process of claim 11 further comprising heating an inner surface of said separator and pulling a vacuum on said separator to facilitate separation.

* * * * *